Aug. 5, 1969  E. S. BIRCH  3,459,103
TOOL GUIDE FOR GEAR FORMING MACHINE
Filed Oct. 20, 1967
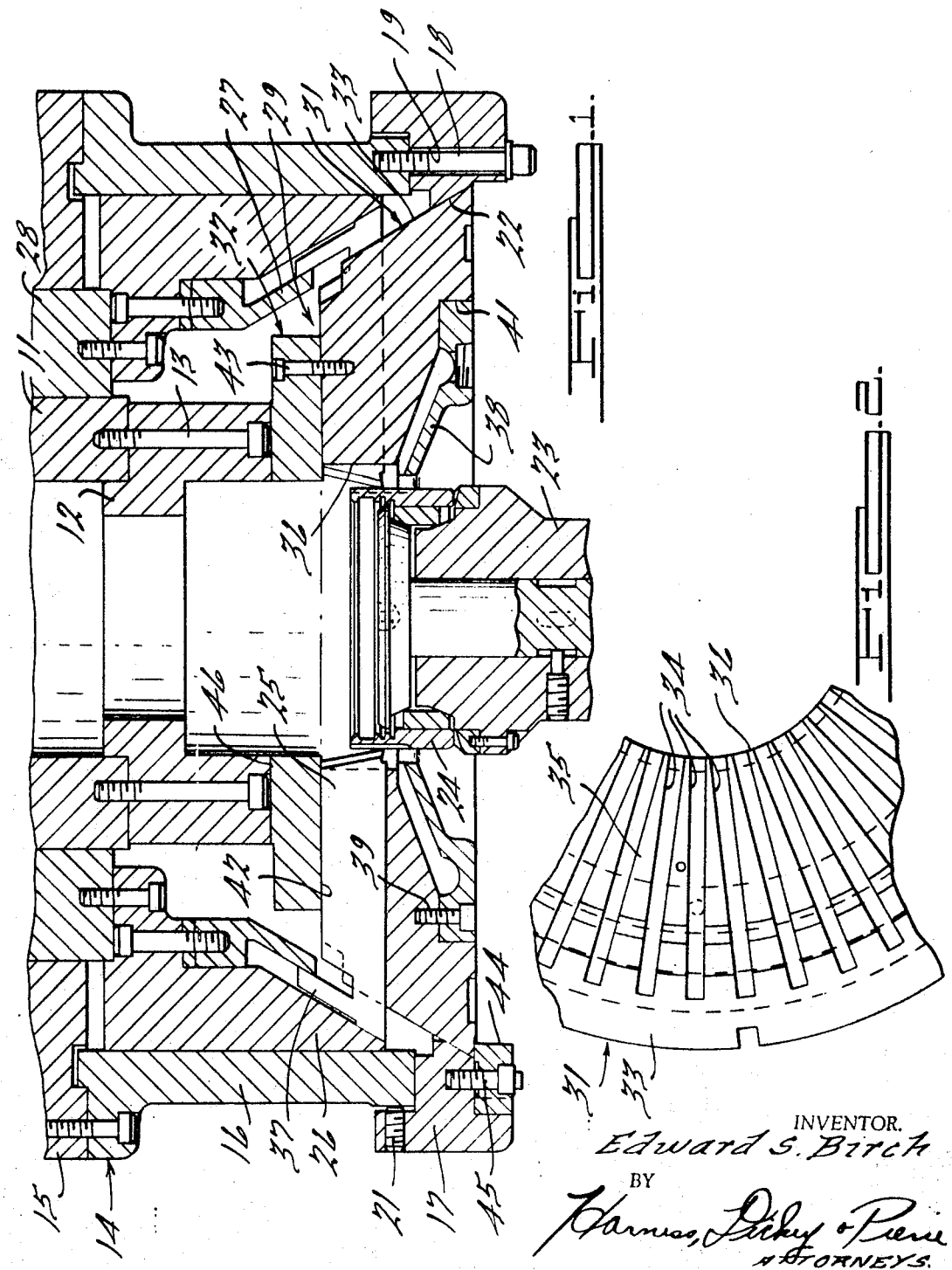
INVENTOR.
Edward S. Birch
BY
Harness, Dickey & Pierce
ATTORNEYS.

United States Patent Office 3,459,103
Patented Aug. 5, 1969

3,459,103
TOOL GUIDE FOR GEAR FORMING MACHINE
Edward S. Birch, Harper Woods, Mich., assignor to Michigan Tool Company, Detroit, Mich., a corporation of Michigan
Filed Oct. 20, 1967, Ser. No. 676,839
Int. Cl. B23f 9/04, 9/06
U.S. Cl. 90—10    3 Claims

ABSTRACT OF THE DISCLOSURE

A tool guide for a gear forming machine having an axially reciprocable workpiece and radially reciprocable gear forming teeth. The guide comprises a ring with a single conical locating surface and radial slots for the tools. An annular top plate fits over this ring.

BACKGROUND OF THE INVENTION

Field of the invention

The invention relates to gear forming machines of the type which simultaneously form all the gear teeth, as exemplified by Patent No. 2,346,867 issued to Harry Pelphrey on Apr. 14, 1944, and entitled, "Machine for Forming Gears." In such machines, a reciprocating ram carries the workpiece and passes back and forth between radially arranged tools which cut the teeth when the workpiece moves in one direction but are retracted to permit return of the workpiece. The tools are held by a cutter head which must be properly aligned with respect to the ram centerline and the tools are advanced and retracted in synchronism with the movement of the ram by a reciprocable sleeve carrying conical surfaces which interfit with complementary surfaces on the outer ends of the tools.

Description of the prior art

A conventional cutter head for gear forming machines of this type is shown in FIGURE 5 of the aforesaid patent. This type of cutter head comprises two parts having interfitting cylindrical surfaces which must be carefully ground, the upper part comprising the cutter head proper with radial tool receiving slots and the lower part or bottom plate having a second cylindrical surface which must be closely fitted with an adjusting ring movable radially to correct for tooth spacing errors. This conventional type of cutter head therefore is not only expensive to fabricate but is difficult to align radially because of the requirement that a number of cylindrical surfaces be closely controlled.

SUMMARY OF THE INVENTION

Briefly, the cutter head assembly comprises a ring having a conical outer surface and a plurality of upwardly extending radial projections for guiding the tools. The conical outer surface interfits with a complementary surface on the adjusting ring, so that the cutter head may be aligned simply by placing the two surfaces together. An annular top plate is provided which is secured to the top of the projections of the ring to hold the tools in position.

BRIEF DESCRIPTION OF THE DRAWINGS

FIGURE 1 is a fragmentary cross sectional view in elevation showing the construction of the cutter head assembly as positioned in the machine, and FIGURE 2 is a fragmentary top elevational view of the ring showing the arrangement of the radial tool guide projections.

DESCRIPTION OF THE PREFERRED EMBODIMENT

As shown in FIGURE 1, the gear forming machine has a cutter head retaining tube 11 to the lower end of which is attached and adaptor 12 by means of bolts 13. A feed cone unit surrounds tube 11, this feed cone unit being generally indicated at 14 and comprising an outer tube 15 from which depends an annular extension 16. An adjusting ring 17 is secured to the lower end of extension 16 by bolts 18 passing through enlarged apertures 19 in the ring. Set screws such as those indicated at 21 are provided for radially adjusting ring 17 with respect to the centerline of the machine in order to properly align the cutting edge as will later appear. Ring 17 has an upwardly and inwardly inclined conical surface 22 which faces inwardly and is used to align the cutter head unit.

A centrally disposed vertically reciprocable ram 23 carries a workpiece 24 which is to be formed by a plurality of radial cutters 25. The arrangement is such that cutters 25 will be fed inwardly while ram 23 is in a lower position, so that upward movement of the ram will cause the cutters to form the gear teeth. The cutters will then be retracted radially outwardly while the ram is moved downwardly for the return stroke. The tool feed mechanism is partially seen in FIGURE 1, including a feed cone 26 and a retractor ring 27 secured to the lower end of a vertically reciprocable sleeve 28 between sleeves 11 and 15. The other portions of the tool feed and retracting mechanism are not shown, since they do not form part of the present invention.

The cutter head unit is generally indicated at 29 and comprises a ring generally indicated at 31 and a top plate generally indicated at 32. The construction of ring 31 is seen in FIGURES 1 and 2, the ring being of annular shape with a conical outer surface 33 which has the same angle as surface 22 and interfits therewith as seen in FIGURE 1. Surface 33, however, extends upwardly from surface 22, and a plurality of radial slots 34 are formed in the upper portion of ring 31, which has a flat top 35 cut by the slots. The slots accommodate tools 25, the central opening 36 of ring 31 being sufficient to accommodate workpiece 24. The outer ends 37 of the tools extend beyond surface 33 and are engaged by feed cone 26 and retractor ring 27. A coolant spray ring 38 is secured by bolts 39 to the bottom of ring 31 and particularly within a recess 41 thereof, the inner lip of this coolant spray ring extending inwardly a short distance beyond surface 36.

The depth of slots 34 equals the height of tools 25 and top plate 32 is an annular generally flat plate which has a surface 42 resting on surface 35 and secured thereto by bolts 43.

It will therefore be seen that in order to align cutter head unit 31 in the machine it is only necessary to fit conical surface 33 against conical surface 22. The cutter head unit will be secured in position by a plurality of circumferentially spaced buttons 44 secured to the underside of ring 17 by bolts 45.

With the construction shown in the aforesaid patent, which had interfitting cylindrical surfaces on the adjusting ring and cutter head, it was difficult to properly align the cutter head units. It should be kept in mind that in this type of machine the cutter head units are interchangeable for different sizes of workpieces. With ordinary machining methods, it is virtually impossible to maintain uniform concentricity and diameters with supposedly interchangeable parts of this nature. It was therefore found necessary, for example, with the former unit to provide means such as set screws for forcing a cutter head unit against one side of the adjusting ring when installing the unit, in order to try to avoid the problems which arose because of different clearances and degrees of eccentricity among the interchangeable units.

With the present invention, however, these problems are eliminated and the interchanging of cutter head units can take place with ease, eliminating the necessity of additional parts such as the aforementioned set screws to achieve proper alignment. It is true, of course, that a close tolerance is maintained in each cutter head unit between the upper surface 46 of ring 32 and conical surface 33, so that the cutter unit will be properly supported by member 12.

While it will be apparent that the preferred embodiment of the invention disclosed is well calculated to fulfill the objects above stated, it will be appreciated that the invention is susceptible to modification, variation and change.

What is claimed is:

1. In a cutter head unit for a gear forming machine of the type having a workpiece being reciprocated by a ram and radially movable cutters, a first ring having a substantially frusto-conical shape and a bore substantially in the center thereof to receive said reciprocating workpiece, a plurality of radial slots in the narrower face of said ring, said radially movable cutters being located in said slots and having cutting edges protruding into said bore to engage said workpiece, a cover plate secured to the face of said ring having said slots and retaining said cutters therein, and a second ring on said machine having an internal conical surface interfitting with the conical surface on said first ring, said second ring having means for radial adjustment thereof relative to the axis of said ram, whereby the axis of the first ring may be aligned with said ram axis by placing its conical surface against the conical surface of said second ring.

2. The combination according to claim 1, the depth of said slots being equal to the height of said cutters, and the surface of said first ring being substantially flat.

3. The combination according to claim 2, said second ring having a plurality of circumferentially spaced buttons secured thereto and retaining said first ring in position by engagement with the end thereof remote from said slots.

References Cited

UNITED STATES PATENTS

| | | | |
|---|---|---|---|
| 2,346,867 | 4/1944 | Pelphrey | 90—10 |
| 2,469,310 | 5/1949 | Pelphrey et al. | 90—10 |

ANDREW R. JUHASZ, Primary Examiner

G. WEIDENFELD, Assistant Examiner